INVENTOR.
Nugent James Vitallo
BY

July 1, 1969  N. J. VITALLO  3,453,444

AUTOMATIC ENGINE STARTER

Filed Sept. 2, 1966  Sheet 3 of 5

INVENTOR.
Nugent James Vitallo
BY
Basil E. Demeur

SIDE      CROSS-SECTION

CROSS-SECTION      SIDE

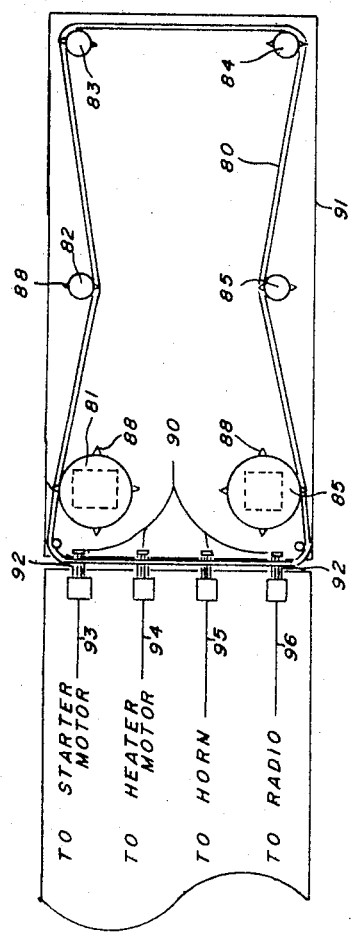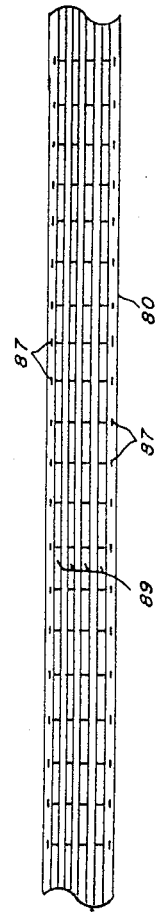

United States Patent Office 3,453,444
Patented July 1, 1969

3,453,444
AUTOMATIC ENGINE STARTER
Nugent James Vitallo, 1821 N. Mulligan Ave.,
Chicago, Ill. 60639
Filed Sept. 2, 1966, Ser. No. 577,068
Int. Cl. F02n 11/08
U.S. Cl. 290—38                              2 Claims

ABSTRACT OF THE DISCLOSURE

An automatic engine starting device comprising timing means including a timer switch, a contact plate electrically responsive to the timing means, a contact panel in spaced relationship with the contact plate, program means removably mounted between the plate and the panel for establishing an electrical time sequence therebetween, the means adapted for making contact between the plate and the panel across the program means in response to the timing means, and contact terminals carried by the panel electrically responsive to the panel and connected to various electrical components of the engine, whereby at a pre set time current passes from a source of electrical power to the contact plate, thence to the contact panel in accordance with the time sequence established by the program means to energize the contact terminals and activate the various electric components attached thereto.

---

This invention is directed to an automatic time-controlled apparatus for starting and stopping an internal combustion engine. More particularly, this invention is directed to a programmed device adapted to be used in conjunction with an internal combustion engine, which can automatically start and stop said engine according to the pre-arranged time period which is coded on a programmed sheet or the like.

Various types of devices have heretofore been described for the purpose of starting and stopping an internal combustion engine automatically and without the presence of an operator. Such devices permit an engine to be started prior to actual use thereby allowing the engine to heat up to normal operating temperature. Furthermore, these devices permit other electrical components on the vehicle to be energized when they are properly connected to the starting device. For example, the heaters, defrosters, radio, windshield wipers and other such devices can be activated once the engine is automatically started. The convenience afforded by the use of such devices is apparent where climatic conditions are either cold or hot or humid whereby the vehicle may be pre-warmed to its normal operating temperature and suitable electrical components, such as the heater, air-conditioner and the like, may be activated prior to the arrival of the operator.

Although the prior art describes other types of devices for automatically starting internal combustion engines, such devices have not proved entirely satisfactory. For example, some devices cannot be easily and rapidly adjusted so as to compensate for changes in temperature, humidity or differences in the starting cycle of different engines. Other devices, although designed to automatically start the engine and thereafter disable the starting mechanism to prevent damage to same while the engine is running, do not effectively operate in this manner and are not therefore practically satisfactory. Still other devices have various electrical components, e.g., heater, defroster, etc., wired to them such that current will continuously drain from the battery during the starting cycle thereby causing the battery to wear down. Furthermore, the prior art devices cannot be readily adapted for use in conjunction with trailers and other camper-type vehicles, since they consist of so many parts and intricate wiring requirements. In effect, these devices must be installed during the manufacture of the whole vehicle and engine, and cannot thereafter be easily modified so as to automatically activate the electrical components of units which may be temporarily connected to the vehicle, such as trailers and camper-type vehicles, when the vehicle's engine is automatically started.

It is, therefore, one object of this invention to provide an apparatus which will automatically start an internal combustion engine at any predetermined time without the presence of the operator in a manner which obviates the deficiences of prior art devices.

It is another object of this invention to provide an automatic engine-starting device which will continuously re-start said engine in the event of one or more engine stalls during the starting cycle.

Another object of this invention is to provide program means as part of the automatic starting apparatus, which means controls the timing periods of the starting and stopping cycles.

A further object of this invention is to provide a program means as part of the automatic starting apparatus which can be easily adapted for starting an engine under such variable factors as temperature, humidity or differences inherent in the starting cycles of different engines.

Another object of this invention is to provide a programmed automatic engine-starting device which requires only minimum voltage during engine start-up, thereby preserving the battery from excessive wear.

Still another object is to provide a programmed automatic engine-starting device which effectively disables the vehicle's starting mechanism once the engine has been started, thereby eliminating possible damage to said starting mechanism.

A further object of this invention is to provide a programmed automatic engine-starting device which will operate to energize other electrical components of the vehicle once the engine has been started.

Another object of this invention is to provide an automatic engine-starting device which is easily adaptable for energizing various electrical components of other units which may be temporarily connected to the vehicle, when said units are properly wired to said automatic starter.

Other objects and advantages of this invention will become apparent from the following description when it is considered in conjunction with the accompanying drawings and appended claims. However, the following description is only meant to describe some of the possible embodiments of this invention and should not, therefore, be construed as limiting this invention to only those particular embodiments described.

In order to better understand the present invention, reference is made to the accompanying drawings wherein:

FIGURE 17 is a side cross-sectional view of the tape-style alternative embodiment.

FIGURE 18 is a side elevational view of the tape program of the tape-style embodiment.

Figure 1:
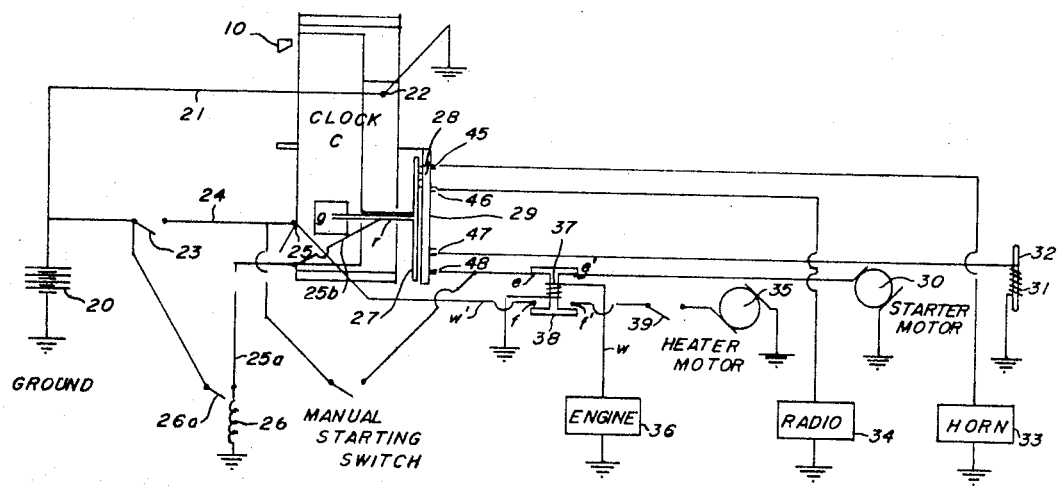
FIGURE 1 is an overall schematic diagram of the automatic starting mechanism in relation to the other electrical components of a standard internal combustion engine.

Referring now to FIGURE 1 of the illustrative drawings, there is shown the electrical circuit of a standard internal combustion engine including a battery 20 from which a wire 21 is connected to an electric clock mechanism C at a contact point 22. Also wired to the battery 20 is the gear selector switch 23 which is shown in the open position, but which is in closed position when the gear selector (not shown) is placed in the neutral position. A wire 24 leads from the gear selector switch 23 to the clock switch 25, which is, in turn, wired to the ignition coil 26 by a wire 25a and to the contact plate 27 by a wire 25b. The contact plate 27 is seen to include a rod r which is engageably connected to the clock mechanism C through a gear box g contained within said clock C at its one end and coextensive with plate 27 at its other end. On the reverse surface of plate 27 are a series of contact brushes 28 in linear arrangement, as best shown in FIGURE 4.

Contact plate 27 is mounted such that the gears in gear box g will engage rod r urging said rod r and plate 27 forward while at the same time causing said plate 27 to rotate in a circular path. When the plate 27 is pushed forward, the contact brushes 28 engage and make contact with the contact panel 29. The panel 29 carries several contact terminals 45, 46, 47 and 48 on its opposing surface. To at least one of said terminals is wired the starter motor 30, while to another terminal is wired the throttle solenoid 31. Various other electrical components are wired to the remaining terminals, such as the radio 34 and the horn 33 as shown in FIGURE 1.

Figure 2:
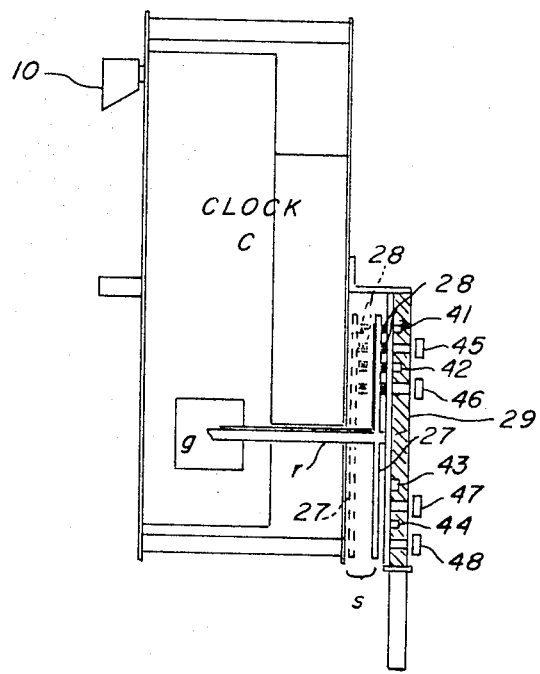
FIGURE 2 is a side elevational view of the automatic timing mechanism and program device.
Figure 8:
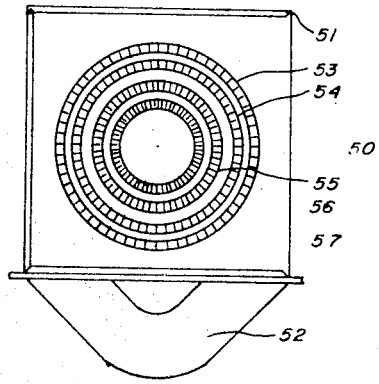
FIGURE 8 is a front view of the program sheet and holder therefor.

In FIGURE 2, the clock mechanism C and the programming components are shown in detail. The contact plate 27, when not in operation, is withdrawn away from panel 29 as illustrated by the phantom lines. The program sheet 50, as will be more precisely observed in FIGURE 8, is inserted in the space s between the plate 27 in withdrawn position and the panel 29. At the predetermined time as set by the operator, a gear (not shown) in the gear box g engages rod r urging said rod r and the plate 27 toward the panel 29 such that the program sheet 50 is securely held in position between the contact brushes 28 and the panel 29. As the plate 27 rotates in a circular path, as previously described, the contact brushes 28 transverse the program sheet 50 through perforations 57 provided in said sheet 50, making contact with the panel 29 each time the brushes 28 meet a perforation 57.

Figure 3:
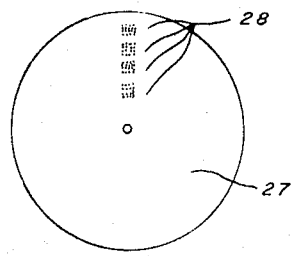
FIGURE 3 is a front view of the contact plate.
Figure 4:
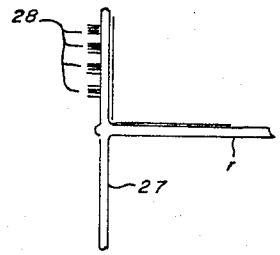
FIGURE 4 is a side elevational cross-section view of the contact plate.

FIGURES 3 and 4 show the construction of the contact plate 27 in detail. The plate 27 is shown to consist of a rod r which is co-extensive with plate 27 on its one surface. The opposing surface of plate 27 carries the contact brushes 28 which are positioned in linear arrangement. Furthermore, the brushes 28 are positioned such that each brush is in horizontal alignment with one of the contact rings 41, 42, 43 and 44 on panel 29 as shown in FIGURE 5.

Figure 5:
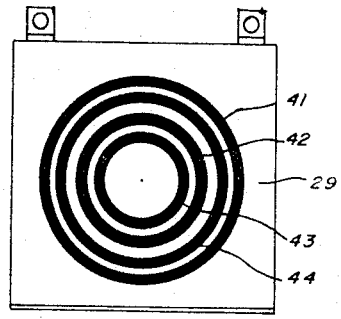
FIGURE 5 is a front view of the contact panel.
Figure 6:
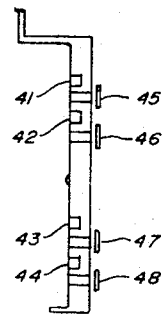
FIGURE 6 is side elevational cross-section view of the contact panel.
Figure 7:
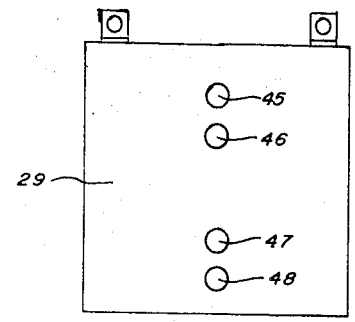
FIGURE 7 is a rear view of the contact panel.

FIGURES 5, 6 and 7 show the construction of panel 29 in detail. FIGURE 5 is a front view of the panel 29, or rather, a view of the surface of panel 29 which faces the plate 27. The contact rings 41, 42, 43 and 44 are constructed in the form of concentric circles as viewed from this position and composed of a suitable electroconductive material. Each of these rings is positioned in horizontal alignment with one of the brushes 28 on plate 27, as previously mentioned. FIGURE 6 illustrates this construction in cross-section. FIGURE 7 shows the opposing or reverse surface of the panel 29. Each of the contact rings 41, 42, 43 and 44 is co-extensive with one of the contact terminals 45, 46, 47 and 48, which are similarly composed of suitable electro-conductive material, and to each contact terminal is wired an electrical component of the engine including the starter motor 30. Of course, contact plate 27 may carry as many brushes 28 as desired, and the panel 29 will carry a similar number of contact rings and terminals to correspond to the number of contact brushes 28. The number of brushes 28, rings and terminals is only determined by the number of electrical components which are to be wired to the panel 29.

The program sheet 50 is shown in FIGURE 8. The program sheet 50 may be formulated from any suitable material which is somewhat flexible and relatively thin. In the preferred embodiment of this invention, a light-weight thin plastic material is used, although other materials such as paper, cardboard, cloth and the like may be utilized. It is to be understood that the particular material utilized is not critical to the operation of this invention so long as it is not electro-conductive. The program sheet 50 is slide into a holder 51 which acts as a supporting frame therefor. The holder 51 carries a handle 52 which can be grasped by the operator for ease of handling.

The program sheet 50 is shown to contain a plurality of concentric rings of perforations 53, 54, 55 and 56. Each of said circles of perforations is positioned such as to be horizontally adjacent to one of the contact brushes 28 on the plate 27 and one of the contact rings 41, 42, 43 and 44. It is to be understood that the sheet 50 may contain as many perforated rings as there are contact brushes 28 and contact rings 41, 42, 43 and 44. In the particular embodiment described herein, four brushes 28, contact rings 41, 42, 43 and 44, and rings of perforations 53, 54, 55 and 56 are shown although any number of same may be employed.

Figure 9:
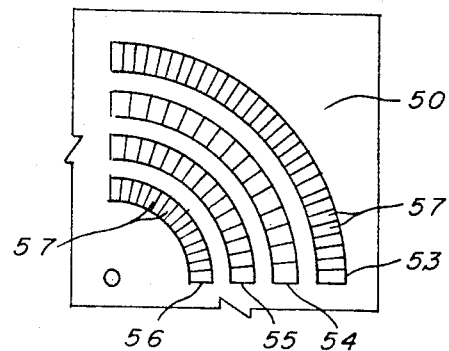
FIGURE 9 is a front view of one quadrant of the program sheet.

There is a direct proportional relationship between the rotational speed of the plate 27 and the number of perforations 57 contained in each ring of perforations on the program sheet 50 in accordance with the time sequence desired. For example, if the plate 27 completes one full rotation every 60 seconds, and the perforated ring contains 60 perforations 57 dispersed uniformly throughout a 360° circle, each perforation 57 will correspond to a one-second time interval. If the ring contains 120 perforations 57 dispersed uniformly throughout a 360° circle, then each perforation 57 will correspond to a half-second time interval. FIGURE 9 shows a first ring of perforations 53 in sheet 50 containning 120 perforations 57 uniformly dispersed throughout a 360° circle. If the plate 27 completes one full rotation every 60 seconds, each perforation 57 corresponds to a half-second time interval. That is to say, when the plate 27 is energized, current will flow across the sheet 50 through the perforations 57 every half-second. Similarly, the second ring 54 contains sixty perforations 57, and assuming the same rotational speed for plate 27 as mentioned above, each perforation 57 corresponds to a one-second time interval and, therefore, current will flow across sheet 50 through the perforations 57 every second.

To better illustrate a particular time sequence of one of the electrical components, reference is made to the starter motor 30 time cycle. The particlular ring perforations which is in horizontal alignment with the contact terminal 48 wired to the starter motor 30, although arranged so as to shut the starter motor 30 off automatically when the engine starts, should not be allowed to grind said starter motor 30 constantly. Also, often a starting cycle must be re-initiated a second time to gain better results. Hence, starting cycles beginning on every 10th, 20th or 30th second with five second durations has been found to be adequate for safeguarding against excessive drain of power on the battery. The starting cycle would thus be as follows:

"ON" for 1st to 5th seconds
"OFF" for 6th to 10th seconds
"ON" for 11th to 15th seconds
"OFF" for 16th to 20th seconds, etc.

The program sheet 50 can be appropriately perforated to yield such a time sequence.

The throttle solenoid 31 is also wired to one contact terminal 47 and controlled by one of the perforated rings. The perforations in the controlling ring may be so punched out as to accommodate the particular needs of different engines or to compensate for different weather conditions. For example, cold weather generally necessitates extra pumping of gas to the engine. Perforations punched out so as to enable energization of the throttle solenoid 31 every five seconds after the initial quick start of the engine has been found adequate. Energization of the throttle solenoid 31 causes the throttle 32 to be moved thereby pumping gas to the engine. The time sequence would, therefore, correspond to the following cycle:

"ON" at 1st, 6th, 11th, 16th, 21st, etc. seconds. Of course, the throttle may be held open for any period of time desired by the operator by appropriate programming, thereby compensating for weather conditions for engine needs.

Figure 13:
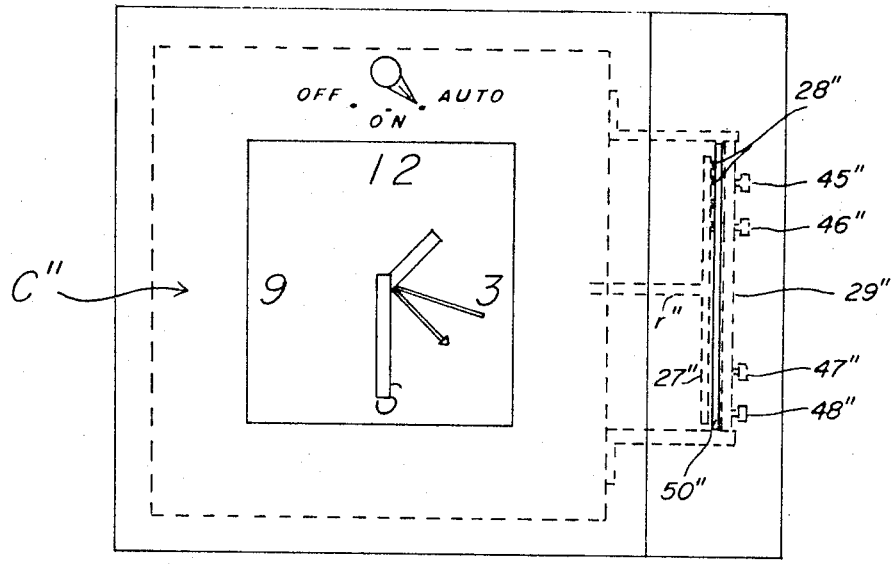
FIGURE 13 is a front elevational view of the key-style alternative embodiment.

In practical operation, the operator leaves the gear selector in the neutral position, which closes the gear selector switch 23, sets the clock mechanism C for any desired time, and turns the master switch 10 to the automatic position (FIGURE 13). The program sheet 50 is slid into the space s provided between the plate 27 and the panel 29. At the pre-set time, the clock switch 25 closes energizing a gear (not shown) in gear box g which gear engages the rod r, urging said rod r and plate 27 forward while at the same time causing said rod r and plate 27 to rotate in a circular path. Since switches 23 and 25 are closed, electrical current from the battery 20 energizes contact plate 27 and, therefore, contact brushes 28. The program sheet 50 is now held securely between the plate 27 and the panel 29 such that the rotating brushes 28 can transverse the sheet 50 only through the perforated rings 53, 54, 55 and 56 to make contact with the contact rings 41, 42, 43 and 44. Contact terminals 45, 46, 47 and 8 are energized thereby energizing the starter motor 30. Since switch 25 is closed, current also passes to the ignition coil 26 energizing same simultaneously with the starter motor 30. Once the starter motor 30 has been energized and the engine 36 started, current from said engine 36 passes through a wire w to energize the relay solenoid 37 causing the relay 38 to break contact with terminals e and e', and establish contact with terminals f and f'. Current may now pass along the wire w' energizing any electrical component which is wired to this line. FIGURE 1 shows the heater motor 35 wired off of wire w', and if the heater motor switch 39 is left in the closed position, the heater motor 35 will be activated.

If desired, the switches to other electrical components may be left closed, and if these components are wired to the contact panel 29, or along wire w', current will flow to and energize that particular component. In FIGURE 1, the horn 33 and the radio 3 are shown to be wired to the contact panel 29. If the radio switch (not shown) is closed, the radio would be energized and commence playing when the panel 29 is energized. Similarly, the horn 33 may be programmed, by punching out appropriate perforations on program sheet 50, to blow at set time intervals thereby alerting the driver that his vehicle has started.

If the engine 36 should stall, relay 38 disestablishes contact with terminals f and f', and re-establishes contact with terminals e and e'. Since panel 29 is still energized, current will again flow to the starter motor 30 to repeat the starting cycle once again. Of course, once the engine is running, the operator need only close the ignition switch 26a in the standard manner and turn the clock mechanism C switch 10 to the "OFF" position. The engine 36 will continue to run without the need of manually restarting same.

As can be observed from FIGURE 1, if any unauthorized person were to attempt to drive the vehicle away after the engine has started, the attempt would be useless. If the gear selector is placed in any positon other than neutral, the gear selector switch 23 opens thereby interrupting the flow of current from the battery 20 to the ignition coil 26 causing the engine 36 to shut down.

The span of time during which the engine will remain running is dependent upon the clock mechanism. The clock mechanism contemplated for this invention is similar in construction to a standard radio alarm clock. As with these devices, once the appropriate component has been activated (the alarm in the case of a radio alarm clock and the engine in this case) and the clock continues to run, a lever contained within the clock mechanism will mechanically open the clock switch, which was previously closed at the pre-set time to activate the device, after a definite period of time. Generally, this is accomplished by attaching a lever to the gear box wheels controlling either the minute hand or the hour hand of the clock so that as these gears move around with the passage of time, the lever will also move. Eventually, the lever meets with and forces open the clock switch thereby turning off the device. As applied to this invention, after some period of time, e.g., 15 minutes for example, a lever contained within the clock mechanism C will mechanically open the clock switch 25 (FIGURE 1) interrupting the flow of current to the ignition coil thereby shutting down the engine. Of course, the time span between start-up and shut-down is variable since it is controlled mechanically by the lever in the clock, and the lever may be positioned on either the minute gear or the hour gear. Furthermore, it is possible to construct the clock such that this time span may also be pre-set by the operator to enable the engine to remain running for as long as desired. If the clock mechanism is constructed in this manner, the operator can pre-set the time at which he desires start-up and the time span during which the engine is to remain running.

Figure 10:
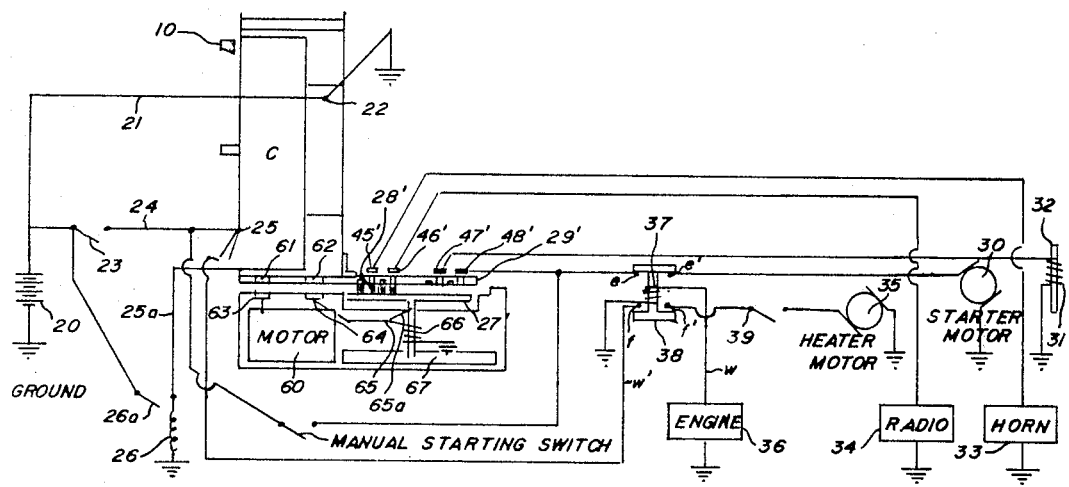
FIGURE 10 is an overall schematic view of the phonograph-style alternative embodiment.
Figures 11, 12:
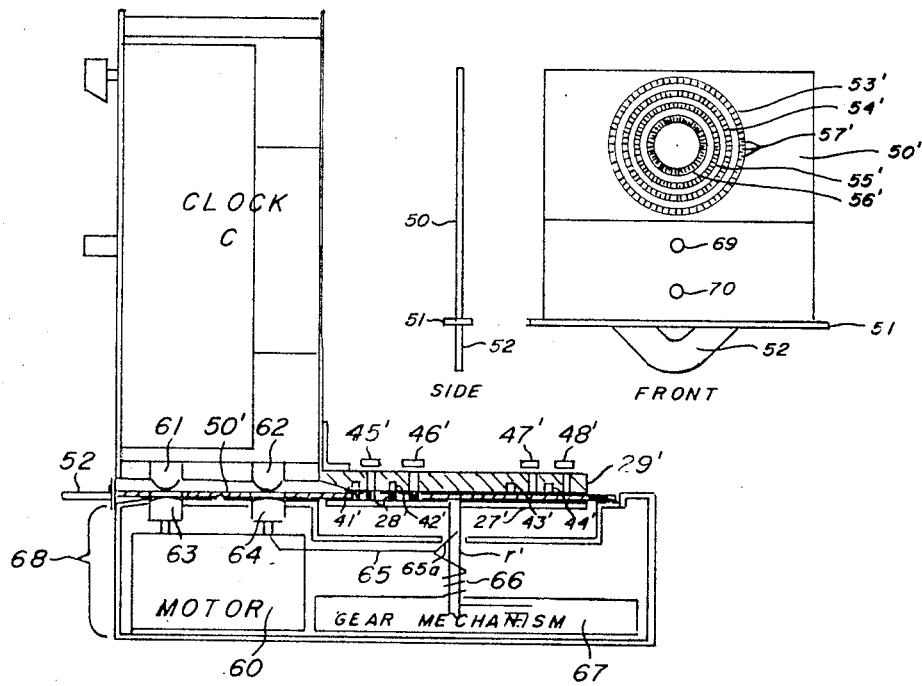
FIGURE 11 is a side elevational view of the phonograph-style alternative embodiment.
FIGURE 12 is a side and front elevational view of the program sheet and holder for the phonograph-style embodiment.

It is apparent from the nature of this invention that the program means, and the mechanics of employing said means, is subject to several modifications. FIGURES 10, 11 and 12 illustrate one alternative embodiment of this invention wherein the program installation is phonograph styled. This installation is wired similarly to the device described above and illustrated in FIGURE 1, as can be seen in FIGURE 10. The program sheet 50' containing perforated rings 53', 54', 55' and 56' is slid under the clock mechanism C' in a flat position and lies on top of a motor mechanism 60. The electrical system is the same except that nothing will operate unless the program sheet 50' is in its proper position. The program sheet 50' carries contact points 69 and 70 which are incorporated in and transverse said sheet 50'. If the sheet 50' is properly inserted, when the clock C' reaches the pre-set time, current will flow through the contact terminals 61 and 62, across the contact points 69 and 70 on the sheet 50' to contact terminals 63 and 64 energizing the motor 60. Current will also pass along a wire 65 leading to the rod solenoid 66 energizing said solenoid 66, which operates to raise the rod r' and therefore, the contact plate 27' into operating position. When the plate 27' is raised into position, the gear mechanism 67 causes the plate 27' to rotate in a circular path. Since the plate 27' has been energized by current passing along the wire 65a, current will then pass from the contact brushes 28' on the plate 27', through the perforations 57' in sheet 50', to the contact rings 41', 42', 43', and 44' on panel 29', and thereby energize the contact terminals 45', 46', 47' and 48'. Since the various electrical components, including the starter motor 30, are wired to the contact terminals 45', 46', 47' and 48' as previously described, they will be accordingly energized and the engine will start. The entire lower phonograph section 68 can be made into a cartridge package capable of being slipped onto slide racks (not shown) provided under the dashboard of the vehicle for example. In this manner, the cartridge package 68 may be slid into place when the device is to be utilized, or removed when not in operation.

Another modification of this invention shown in FIG-URE 13 is the key-like program installation. This design provides the same fundamental electrical circuitry as the device illustrated in FIGURES 1 and 2 except that the program installation is positioned adjacent to and in horizontal alignment with the clock mechanism C". The program sheet 50" is inserted into the installation in a manner similar to inserting a key in a lock. Again the rod r" and plate 27" are energized at the pre-set time and caused to rotate in a circular path. Current is transferred to the panel 29" energizing the contact terminals 45", 46", 47" and 48". The various electrical components being wired to these terminals, will in turn be energized in the manner heretofore described. This design provides the simplest installation from the standpoint of ease of operation by the operator and perhaps the most economically feasible design from the standpoint of manufacture.

Figure 14:
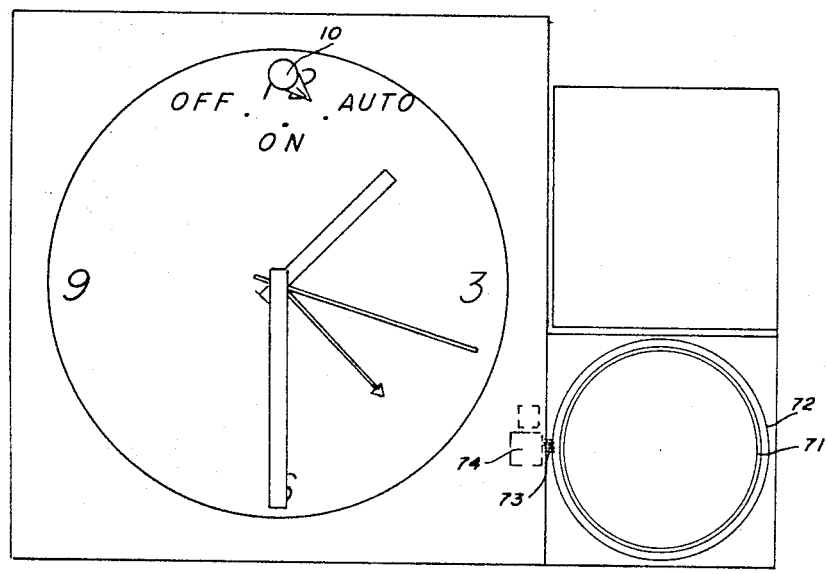
FIGURE 14 is front elevational view of the cylinder-style alternative embodiment.
Figure 15:
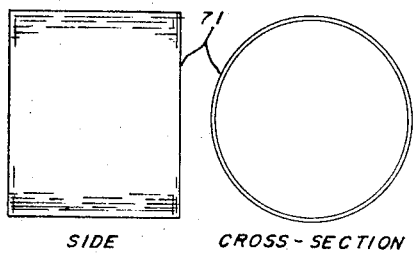
FIGURE 15 is a side and front elevational view of the contact cylinder plate of the cylinder-style embodiment.
Figure 16:
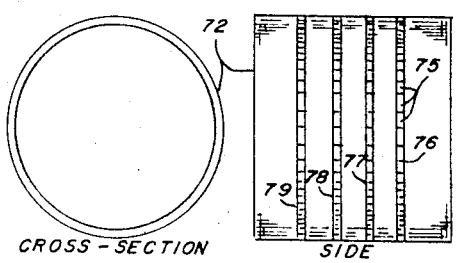
FIGURE 16 is a side and front elevational view of the cylinder program of the cylinder-type embodiment.

FIGURES 14, 15 and 16 illustrate a cylinder-style programming installation. Again, in this embodiment, similar electrical circuitry is provided, the basic difference being in the design of the contact plate 71 and the program means 72. The contact plate 71 is wired to the clock mechanism C''' such that at the pre-set time, the contact plate 71 is energized and caused to rotate in a circular path. The program sheet 72 is inserted between the contact plate 71 and the contact brushes 73 such that when the plate 71 is energized, current will pass across the sheet 72 through the perforations 75 provided in the sheet 72 to the contact brushes 73 mounted on the contact panel 74. The sheet 72 contains a plurality of parallel rings 76, 77, 78 and 79 (FIGURE 16) of perforations 75. The perforations 75 are again punched out by the operator to correspond to the time sequence desired. Contact terminals (not shown) are carried by the panel 74 and the various electrical components are wired to these terminals in the manner described above. The brushes 73 are energized when current passes through the perforations 75 in sheet 72 and current is thereby transferred to the panel 74, the terminals carried on the panel, and the electrical components wired to said terminals.

FIGURES 17 and 18 illustrate the tape-style alternative embodiment. The tape 80 is fashioned in the form of a belt and is placed around drive wheels 81, 82, 83, 84, 85 and 86. The tape 80 carries notches 87 (FIGURE 18) along both of its edges such that the drive wheels, which contain spurs 88 around the periphery thereof, may engage and transport the tape 80 when the drive wheels are energized by a motor mechanism (not shown). The operation of this embodiment is similar to the other embodiments heretofore described. The tape cartridge 91 carries a series of contact plates 90 which are wired to a clock mechanism (not shown) similar to the clock shown in FIGURE 14. When the clock reaches the pre-set time, the plates 90 are energized and the motor mechanism controlling the drive wheels 81, 82, 83, 84, 85 and 86 is activated causing drive wheels to rotate. The tape program 80 moves along the surface of the plates 90 between the said plates 90 and the contact brushes 92. Current then passes from the plate 90, through the perforations 89 in the tape 80 to the brushes 92. The brushes 92 are mounted on contact panels 93, 94, 95 and 96 to which are wired the various electrical components as illustrated. The electrical components are then energized according to the time sequence established by the perforations 89 in the tape program 80.

It is apparent from this disclosure that various electrical components may be wired to the contact panel or to one of the wires leading from the panel. In this manner, units such as trailers, campers and the like which are temporarily connected to the vehicle, which carries the automatic starting device, may also have their electrical system easily connected to the automatic starting device so as to activate any of the electrical components which are carried by the unit when the vehicle engine is started. Furthermore, this device in any of its alternative embodiments is sufficiently simple in construction so as to be capable of incorporating same into any existing vehicle. Since the operator may perforate the program means to correspond to any time sequence desired, the device offers adaptability to any of a wide range of differences in engines or weather conditions and the like.

Others may practice this invention in any of the numerous ways which will be suggested to one skilled in the art upon reading this disclosure. All such practice of the invention is considered to be covered hereby provided it falls within the scope of the appended claims.

I claim:
1. In an automatic engine starting device for activating an engine and its various electrical components including the starter motor at a pre-set time, and having a source of electrical power associated therewith, the combination comprising: a clock mechanism having a time selector for pre-setting the particular time at which activation of the device is desired, a contact plate movably mounted and electrically responsive to the clock mechanism, a plurality of contact brushes mounted on said plate, a contact panel in linear alignment with the plate, a plurality of electroconductive contact rings carried by and transversing the panel having two surfaces, one surface in spatial alignment with the contact brushes, a plurality of contact terminals carried by the opposed surface of the contact rings said terminals being electrically responsive to the panel and connected to various electrical components of the engine, a program sheet removably mounted between the plate and the panel having perforations arranged in an adjustable pattern for establishing a particular electrical time sequence, whereby at the pre-set time, the contact plate is urged toward the panel such that the brushes may contact the contact rings in the panel through the perforations in the program sheet while current is caused to pass between the source of electrical power and the terminals through the plate, brushes and rings, in accordance with the time sequence established by the program sheet, thereby energizing the terminals and the various electrical components connected thereto including the starter motor, automatically starting the engine.

2. In an automatic engine starting device for activating an engine and its various electrical components including the starter motor at a pre-set time, and having a source of electrical power associated therewith, the combination comprising:
   (a) timing means including a timer switch;
   (b) a contact plate electrically responsive to said timing means;
   (c) a contact panel in spaced relationship with the contact plate, said contact plate movably mounted between the timing means and the contact panel;

(d) a program sheet of flexible material having perforations arranged in an adjustable pattern therein corresponding to the time sequence desired removably mounted between the plate and the panel;

(e) a plurality of contact brushes having two ends, one of said ends mounted upon the contact plate and the other end adapted to be engageable with the contact panel across the program means as determined by the time sequence established by the perforations in said program sheet;

(f) contact terminals electrically responsive to the panel, carried by said panel and having connections to various electrical components, whereby at the pre-set time, current passes between the source of electrical power and the contact plate, then between the plate and the contact panel in accordance with the time sequence established by the program means, thereby energizing the contact terminals and the various electrical components connected thereto including the starter motor, to automatically start the engine.

References Cited

UNITED STATES PATENTS 3,043,963   7/1962   Teikari _____ 290—38 X

ORIS L. RADER, *Primary Examiner.*

W. E. DUNCANSON, JR., *Assistant Examiner.*

U.S. Cl. X.R.

307—10